United States Patent
Kim et al.

(10) Patent No.: US 7,630,521 B2
(45) Date of Patent: Dec. 8, 2009

(54) BIOMETRIC IDENTIFICATION APPARATUS AND METHOD USING BIO SIGNALS AND ARTIFICIAL NEURAL NETWORK

(75) Inventors: Kyung-ho Kim, Yongin-si (KR); Kyeong-seop Kim, Chungju-si (KR); Tae-ho Yoon, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 11/312,442

(22) Filed: Dec. 21, 2005

(65) Prior Publication Data

US 2006/0215883 A1 Sep. 28, 2006

(30) Foreign Application Priority Data

Mar. 25, 2005 (KR) .................. 10-2005-0024938

(51) Int. Cl.
*G06K 9/00* (2006.01)
(52) U.S. Cl. .................. 382/115; 382/128; 382/156; 382/159; 600/516
(58) Field of Classification Search .................. 382/115, 382/128, 156, 159; 600/300, 509, 516
See application file for complete search history.

(56) References Cited

U.S. PATENT DOCUMENTS

| | | | | |
|---|---|---|---|---|
| 4,796,638 A * | 1/1989 | Sasaki | .................. | 600/509 |
| 5,645,069 A * | 7/1997 | Lee | .................. | 600/518 |
| 6,491,629 B1 * | 12/2002 | Bousseljot et al. | .................. | 600/300 |
| 6,609,023 B1 * | 8/2003 | Fischell et al. | .................. | 600/515 |
| 7,181,763 B2 * | 2/2007 | Hiraiwa et al. | .................. | 726/2 |
| 7,245,960 B2 * | 7/2007 | Yasushi et al. | .................. | 600/509 |
| 7,249,263 B2 * | 7/2007 | Chaudhari et al. | .................. | 713/186 |
| 7,272,437 B2 * | 9/2007 | Macadam et al. | .................. | 600/515 |
| 7,333,963 B2 * | 2/2008 | Widrow et al. | .................. | 706/18 |
| 2005/0267597 A1 * | 12/2005 | Flaherty et al. | .................. | 623/24 |
| 2005/0273890 A1 * | 12/2005 | Flaherty et al. | .................. | 901/50 |
| 2005/0281439 A1 * | 12/2005 | Lange | .................. | 382/115 |
| 2006/0106571 A1 * | 5/2006 | Kim et al. | .................. | 702/179 |
| 2006/0215883 A1 * | 9/2006 | Kim et al. | .................. | 382/115 |
| 2007/0142735 A1 * | 6/2007 | Shin et al. | .................. | 600/509 |

OTHER PUBLICATIONS

Lena Biel, et al., "ECG Analysis: A New Approach in Human Identification", IEEE Transactions on Instrument and Measurement, vol. 50, No. 3, Jun. 2001.

(Continued)

*Primary Examiner*—Gregory M Desire
(74) *Attorney, Agent, or Firm*—Sughrue Mion, PLLC (57) ABSTRACT

A biometric identification apparatus and method using bio signals and an artificial neural network, are provided. The biometric identification apparatus includes: a periodic signal extraction unit which extracts one or more periodic signals from an input bio signal; a template calculation unit which calculates a template value using the extracted periodic signals; a template storage unit which stores a plurality of template values corresponding to a plurality of living bodies; and a reading unit which reads the template value that is most approximate to the template value calculated by the template calculation unit from the template storage unit. Accordingly, it is possible to identify a living body by taking into consideration all of the characteristics of bio signals detected from the living body.

26 Claims, 6 Drawing Sheets

OTHER PUBLICATIONS

T.W. Shen, et al., "One-Lead ECG for Identity Verification $2^{nd}$ Joint Conference of IEEE Engineering in Medicine and Biology Society and the Bio medical Engineering Society", Proceedings of the Second Joint EMBS/BMES Conference Houston, TX, USA, Oct. 23-26, 2002.

Masaki Kyoso, et al., "Development of an ECG Indentification System", 2001 Proceedings of the $23^{rd}$ Annual EMBS International Conference, Oct. 25-28, Istanbul, Turkey.

* cited by examiner

BIOMETRIC IDENTIFICATION APPARATUS AND METHOD USING BIO SIGNALS AND ARTIFICIAL NEURAL NETWORK

CROSS-REFERENCE TO RELATED PATENT APPLICATION

This application claims priority from Korean Patent Application No. 10-2005-0024938, filed on Mar. 25, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to biometric identification using bio signals, such as electrocardiogram (ECG) signals, and an artificial neural network, and more particularly, to biometric identification using bio signals and an artificial neural network, in which a living body is identified by extracting periodic signals from a bio signal detected from the living body, calculating a template value using the extracted periodic signals, and analyzing the calculated template value, and a computer-readable recording medium storing a computer program for executing biometric identification.

2. Description of the Related Art

Presently, authentication apparatuses are commonly used in various fields, such as the fields of finance, communications, and security. In particular, biometric identification apparatuses using the characteristics of various parts of the human body which cannot be lost or are less likely to be copied have become widespread in recent years.

Biometric identification apparatuses use various parts of the human body, such as the iris, fingerprints, the face, and the pattern of blood vessels on the back of the hand.

Iris identification apparatuses identify an individual based on the individual's iris, which is an organ controlling the amount of light incident on the retina, because people have irises with different shapes. However, conventional iris identification apparatuses may not be able to precisely identify an individual, especially when the individual blinks or moves his or her eyes. Further, conventional iris identification may be considerably affected by external illumination.

Fingerprint identification apparatuses identify an individual by processing an image of the individual's fingerprints and then analyzing the processed image. However, conventional fingerprint identification apparatuses may not be able to precisely identify an individual because of, for example, sweat or deformation of fingerprints.

Face identification apparatuses are not yet suitable for user authentication because they may incorrectly identify the face of an individual to be authenticated depending on the angle of the face, a facial expression, or the age of the individual to be authenticated, especially when there is an involuntary change in the facial expression of the individual to be authenticated.

Vein pattern identification apparatuses identify an individual by taking an image of the pattern of veins on the back of the hand using a contact-type infrared ray photographing device. However, it is difficult to standardize vein patterns and establish a database of the vein patterns.

An example of a biometric identification apparatus using bio signals, such as electrocardiogram (ECG) signals, is taught by T. W. Shen, W. J. Tompkins, and Y. H. Hu ("One-Lead ECG for Identify Verification", Proceedings of the 2nd Annual Joint Conference of the IEEE Engineering in Medicine and Biology Society and the Biomedical Engineering Society, pp. 62-63, 2002). This biometric identification apparatus, however, does not take the characteristics of the waveform of an ECG signal peculiar to each individual but simply measures the distance between a plurality of feature points on the waveform of the ECG signal. Information regarding the individual obtained from the measured distance is limited and insufficient to identify the individual.

Another example of a biometric identification apparatus using ECG signals is taught by Lean Biel, Ola Pettersson, Lennart Philipson, and Peter Wide ("ECG Analysis: A New Approach in Human Identification", IEEE Transactions on Instrumentation and Measurement, Vol. 50, No. 3, pp. 808-812, June 2001). This biometric identification apparatus also cannot provide sufficient information to identify and authenticate an individual.

Still another example of a biometric identification apparatus using ECG signals is taught by Masaki Kyoso and Akihiko Uchiyama ("Development of an ECG Identification System", Proceedings of the 23rd Annual International Conference of the IEEE Engineering in Medicine and Biology Society, pp. 3721-3723). This biometric identification apparatus also cannot provide sufficient information to identify and authenticate an individual.

SUMMARY OF THE INVENTION

The present invention provides a biometric identification apparatus using bio signals and an artificial neural network, which identifies a living body by extracting periodic signals from a bio signal detected from the living body, calculates a template value using the extracted periodic signals, and analyzes the calculated template value.

The present invention also provides a biometric identification method using bio signals and an artificial neural network, in which a living body is identified by extracting periodic signals from a bio signal detected from the living body, calculating a template value using the extracted periodic signals, and analyzing the calculated template value.

The present invention also provides a computer-readable recording apparatus storing a computer program for executing the biometric identification method.

According to an aspect of the present invention, there is provided a biometric identification apparatus using bio signals and an artificial neural network. The biometric identification apparatus includes: a periodic signal extraction unit which extracts one or more periodic signals from an input bio signal; a template calculation unit which calculates a template value using the periodic signals which are extracted; a template storage unit which stores a plurality of template values which correspond to a plurality of living bodies; and a reading unit which reads the template value that is most approximate to the template value which is calculated by the template calculation unit from the template storage unit.

The periodic signal extraction unit may generate temporally normalized signals by computing a Fourier series of each of the periodic signals which are extracted and then computing an inverse Fourier series of the Fourier series of each of the periodic signals which are extracted. The template calculation unit may calculate the template value using the temporally normalized values which are generated. The temporally normalized signals which are generated may each have an identical temporal width.

The biometric identification apparatus may also include an analog-to-digital conversion unit which converts the temporally normalized signals which are generated into digital signals through a sampling operation. Here, the template calculation unit calculates the template value using the digital signals, and the digital signals each comprise an identical number of samples.

The biometric identification apparatus may also include an identification unit which identifies a living body corresponding to the template value which is read out from the template storage unit as a living body which corresponds to the input bio signal.

The biometric identification apparatus may also include: an examination unit which determines whether a living body corresponding to the template value which is read out from the template storage unit is identical to a living body to be authenticated; and an authentication unit which authenticates the input bio signal as a bio signal which is detected from the living body to be authenticated in response to the determination results which are provided by the examination unit.

The periodic signal extraction unit may generate magnitude-normalized signals by normalizing the magnitude of the periodic signals which are extracted, and the template calculation unit may calculate the template value using the magnitude-normalized signals.

According to another aspect of the present invention, there is provided a biometric identification method using bio signals and an artificial neural network. The biometric identification method includes: extracting one or more periodic signals from a given bio signal; calculating a template value using the periodic signals which are extracted; and reading a template value that is most approximate to the template value which is calculated from among a plurality of prepared template values which correspond to a plurality of living bodies and identifying a living body which corresponds to the template value which is read as a living body which corresponds to the given bio signal.

According to another aspect of the present invention, there is provided a computer-readable recording medium storing a computer program for executing a biometric identification method, the biometric identification method including: extracting one or more periodic signals from a given bio signal; calculating a template value using the extracted periodic signals; and reading a template value that is most approximate to the template value which is calculated from among a plurality of prepared template values which correspond to a plurality of living bodies and identifying a living body which corresponds to the template value which is read as a living body which corresponds to the given bio signal.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Exemplary embodiments of the present invention will now be described with reference to the accompanying drawings. Terms used in this disclosure have been defined in consideration of their functions in this disclosure and may have different meanings depending on a user's intent or understanding. Therefore, the terms are defined based on the invention claimed in this disclosure.

Figure 1:
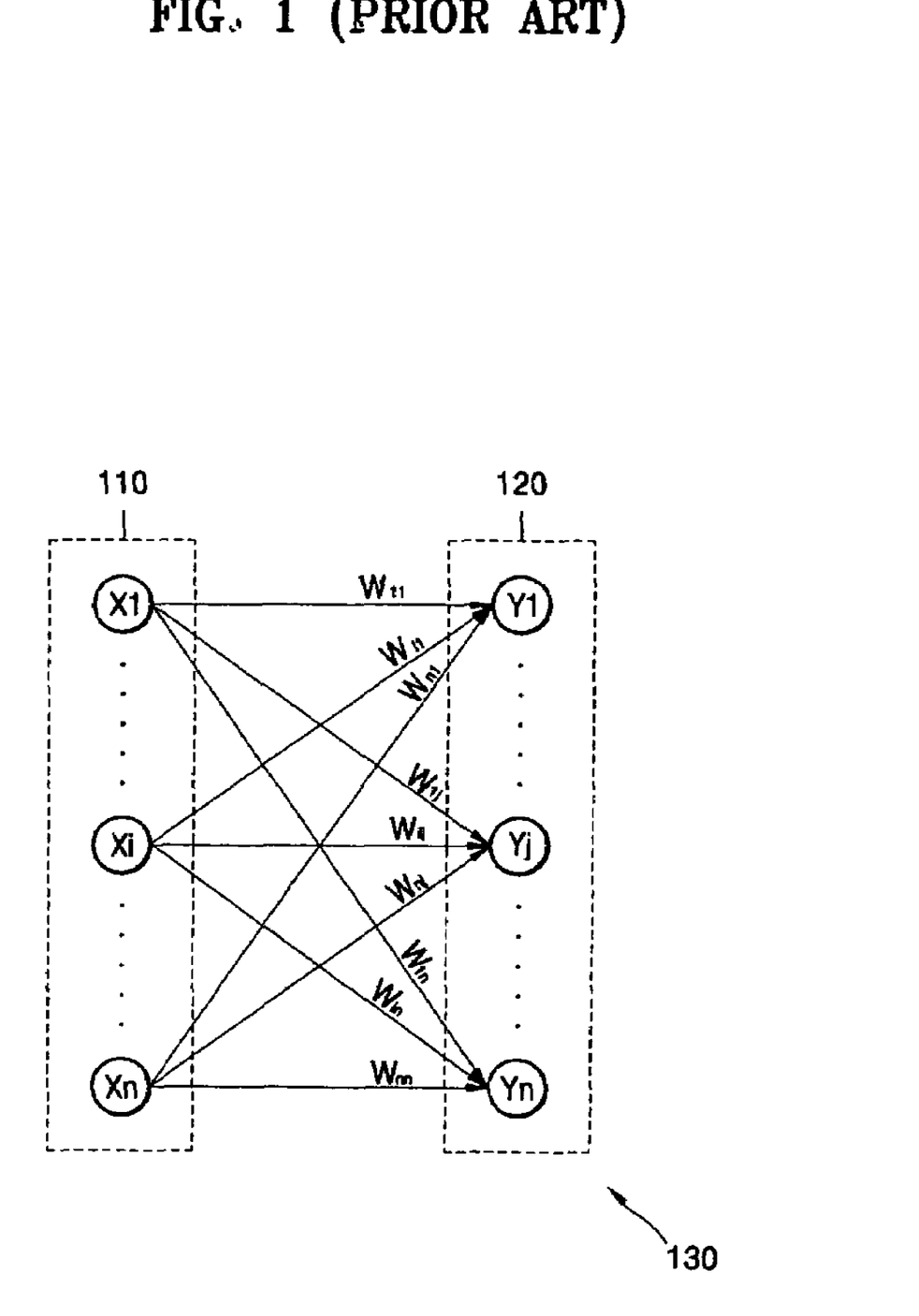
FIG. 1 is a diagram illustrating an artificial neural network.

FIG. 1 is a diagram illustrating an artificial neural network. A computer processes information in a different way from the way the brain processes information. In more detail, a computer processes information in series by dealing with one command at a time, while the brain processes information in parallel by dealing with a plurality of commands at the same time. In addition, a computer requires a problem solving process (i.e., an algorithm) to be written in a computer language to solve problems, while the brain solves problems through learning. In addition, the brain can solve even problems that have not yet been learned through reasoning. An artificial neural network resembles such a biological neural network as the brain. An artificial neural network will now be described in further detail.

Neurons are cells of a living body specialized for dealing with information. A neuron comprises a cell body, axons, and dendrites.

Axons are nerve fibers that transmit signals from a cell body of one neuron to another neuron. Dendrites are fibers of a neuron that receive signals from other neurons. In other words, axons of one neuron are connected to dendrites of another neuron, and the axonal-dendritic connection between a pair of adjacent neurons is called a synapse.

A neuron is believed to receive signals from an average of several thousands of or several tens of thousands of axons of other neurons. As many dendrites as possible must branch out from a cell body of a neuron in order to connect to such a considerable number of axons of other neurons. A cell body of a neuron performs computation on a considerable number of signals input to the neuron and transmits the computation results to another neuron via axons. Information necessary for deciding what computation or process to perform in a neural network is believed to be stored in the synapses.

In general, the potential is higher inside a neuron than outside. However, when a signal is input to a neuron under a predetermined set of conditions, the neuron is excited so that the potential inside the neuron abruptly increases. This excitement is called firing. Information regarding the variation in the potential of a neuron when the neuron fires is transmitted to another neuron as an electrical pulse signal.

The firing of a neuron will now be described in further detail. When electrical pulses arrive at dendrites of a neuron, the voltages of the dendrites of the neuron may slightly vary. The variations in the voltages of the dendrites of the neuron are transmitted to the cell body of the neuron, and if the sum of the variations in the voltages of the dendrites of the neuron exceeds a predetermined threshold, the neuron may fire. Otherwise, the neuron does not fire.

The variations in the voltages of the dendrites of the neuron may be positive voltage variations or negative voltage variations. Neurons are divided into excitable neurons and inhibitory neurons. Excitable neurons produce positive voltage variations when receiving electrical pulses from other neurons, while inhibitory neurons produce negative voltage variations when receiving electrical pulses from other neurons. In short, neurons receive signals from other neurons, calculate a weight-averaged sum of the received signals by multiplying the received signals by predetermined weights and averaging the multiplication results, and decide whether to fire based on the weight-averaged sum of the received signals. The predetermined weights correspond to how efficiently the synapses transmit signals and may have a positive value or a negative value. An artificial neural network is established based on a mathematical model representing the aforementioned properties of a biological neural network.

Artificial neural networks may be classified into feedforward neural networks and recurrent neural networks. A feedforward neural network is an artificial neural network in which signals are unidirectionally transmitted, and a recurrent neural network is an artificial neural network in which signals are bidirectionally transmitted.

In a feedforward neural network, a non-linear mapping of inputs and outputs usually exists. FIG. 1 is a diagram illustrating an artificial neural network 130, which is an example of the feedforward neural network. Referring to FIG. 1, the artificial neural network 130 is comprised of a plurality of layers including a first layer 110 and a second layer 120. The first layer 110 processes signals received from a previous layer (not shown) and transmits the processed signals to the second layer 120. The first layer 110 includes neurons X1 through Xn, and the second layer 120 includes neurons Y1 through Yn. $W_{11}$ through $W_{nn}$ are weights indicating how firmly the neurons X1 through Xn of the first layer 110 and the neurons Y1 through Yn of the second layer 120 are connected to one another. Specifically, $W_{ij}$ is a weight indicating how firmly the i-th neuron Xi of the first layer 110 is connected to the j-th neuron Yj of the second layer 120.

The brain can appropriately change its reactions to external stimuli through learning as well as experience. Likewise, weights used in an artificial neural network may be changed through learning. For example, a learning theory set forth by Donald Hebb, a Canadian psychologist, based on his observations of the hippocampus of the brain can be used. If a bio signal detected from a living body to be authenticated is input to an artificial neural network, weights used in the artificial neural network may be changed an unlimited number of times through learning to be compatible with the input bio signal. Hereinafter, weights used in an artificial neural network will be referred to as template values.

Figure 2:
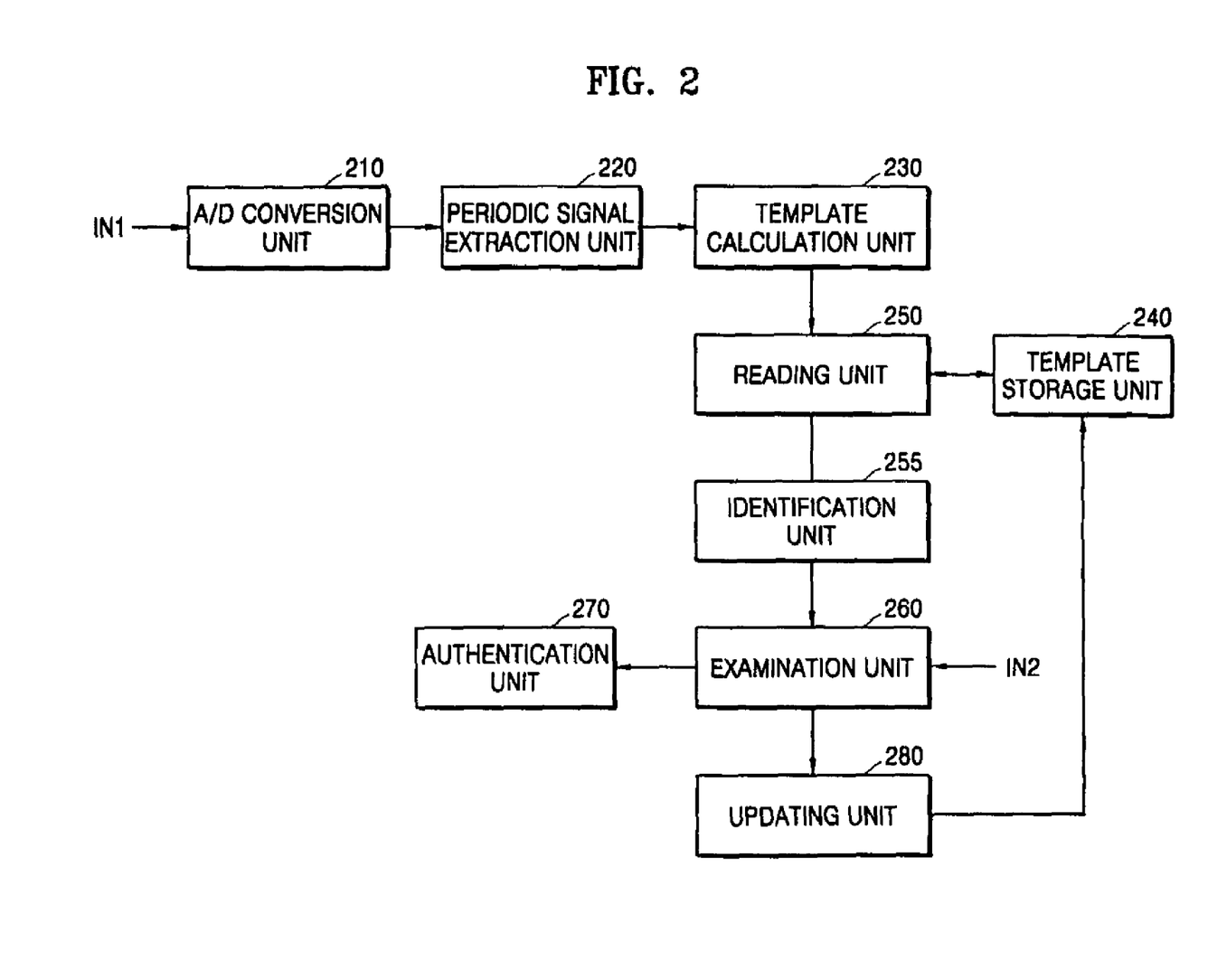
FIG. 2 is a block diagram of a biometric identification apparatus using bio signals and an artificial neural network according to an exemplary embodiment of the present invention.

FIG. 2 is a block diagram of a biometric identification apparatus using bio signals and an artificial neural network according to an exemplary embodiment of the present invention. Referring to FIG. 2, the biometric identification apparatus includes an analog-to-digital (A/D) conversion unit 210, a periodic signal extraction unit 220, a template calculation unit 230, a template storage unit 240, a reading unit 250, an identification unit 255, an examination unit 260, an authentication unit 270, and an updating unit 280.

Referring to FIG. 2, a bio signal IN1 is input to the biometric identification apparatus. The bio signal IN1 is a function of time. The bio signal IN1 may be one of an ECG signal, an electroencephalogram (EEG) signal, an electromyogram (EMG) signal, or an electrical dermal activity (EMA) signal. For the convenience of explanation, it is assumed that a living body to be authenticated is a human body and a bio signal detected from the living body to be authenticated is an ECG signal.

The bio signal IN1 may be sensed by a sensor attached to a living body. For example, the bio signal IN1 may be an ECG signal sensed by a sensor attached to the wrist or palm of an individual.

Bio signals detected from different living bodies may be different from one another. In addition, even when detected from the same living body, bio signals may vary with time or may vary according to the state of the living body from which they have been detected. For example, ECG signals detected from the same living body at different times may be different from one another depending on the health or emotional states of the living body when they are respectively detected.

The A/D conversion unit 210 converts a predetermined analog signal into a digital signal through sampling. The A/D conversion unit 210 may sample the predetermined analog signal at predetermined intervals of time or at random intervals of time. The predetermined analog signal may be the bio signal IN1 or a periodic signal detected from the bio signal IN1.

The periodic signal extraction unit 220 may extract a periodic signal from a predetermined digital signal. The predetermined digital signal may be the digital signal into which the predetermined analog signal is converted by the A/D conversion unit 210 or the bio signal IN1.

The periodic signal extraction unit 220 may extract one or more periodic signals from the digital signal into which the predetermined analog signal is converted by the A/D conversion unit 210 or from the bio signal IN1. For the convenience of explanation, it is assumed that the periodic signal extraction unit 220 extracts m periodic signals (where m is a positive integer value greater than 1) either from the digital signal into which the predetermined analog signal is converted by the A/D conversion unit 210 or from the bio signal IN1. The period of the digital signal into which the predetermined analog signal is converted by the A/D conversion unit 210 or the period of the bio signal IN1 may vary with time.

Figure 3A:
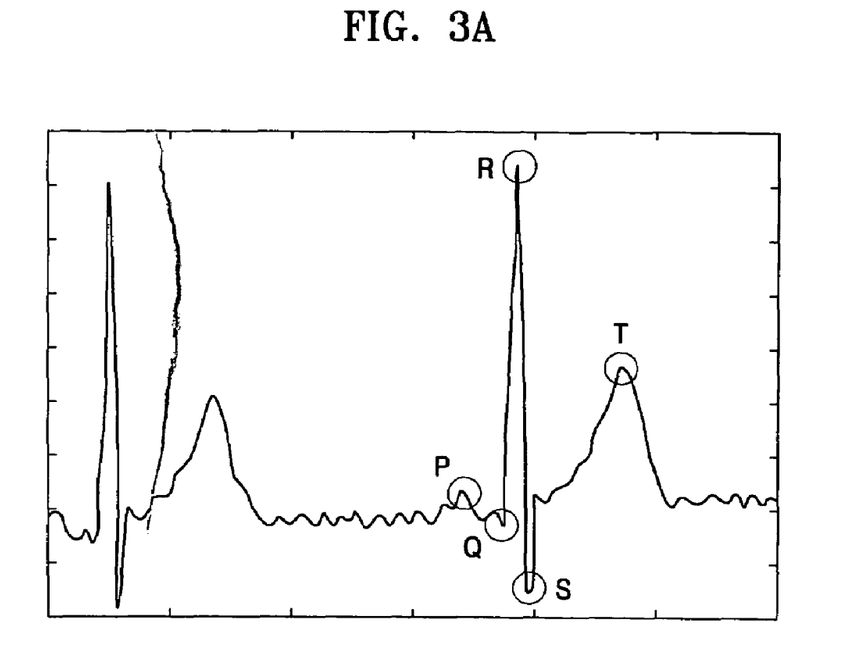
FIGS. 3A and 3B are diagrams illustrating examples of electrocardiogram (ECG) signals.
Figure 3B:
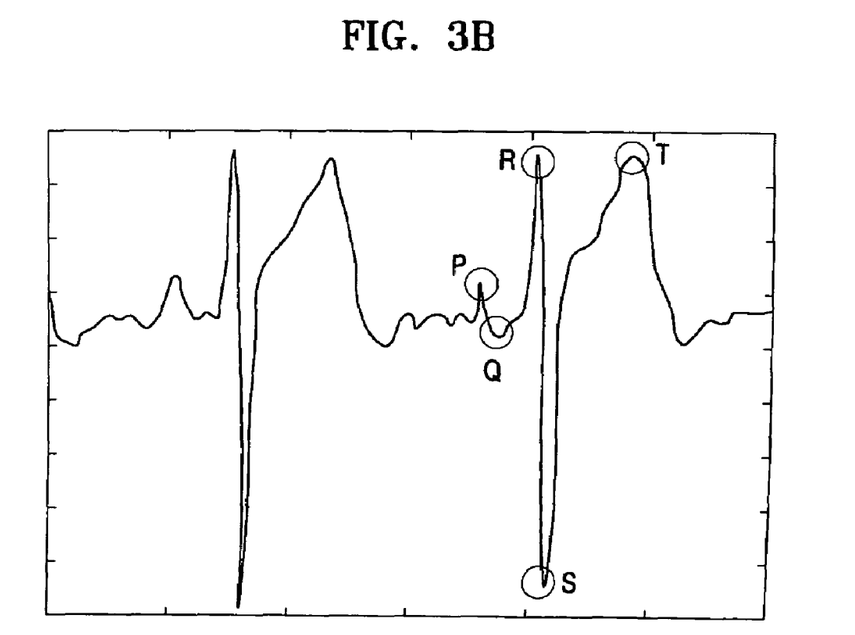

The extraction of m periodic signals by the periodic signal extraction unit 220 will now be described in further detail. FIGS. 3A and 3B are diagrams illustrating examples of ECG signals. Referring to FIGS. 3A and 3B, the waveforms of the ECG signals have five inflection points P, Q, R, S, and T. If the inflection points P, Q, R, S, and T of the waveforms of the ECG signals are separated by predetermined intervals of time, they are considered to constitute one periodic signal. Here, inflection points are points where the waveform of a signal abruptly changes. The definition of 'abruptly' here may be determined based on a set of reference values determined in advance.

The periodic signal extraction unit 220 extracts m periodic signals from the bio signal IN1 using the inflection points of the waveform of the bio signal IN1. The periodic signal extraction unit 220 may generate temporally normalized signals by computing the Fourier series of each of the m periodic signals extracted from the bio signal IN1 and then computing the inverse Fourier series of the Fourier series of each of the m extracted periodic signals. The Fourier series of each of the m extracted periodic signals may be computed using Equation (1):

$$F(f_{i,j}(t)) = \sum_{k=1}^{N} C_{i,N} e^{jkw_o t} (i = 1, 2, \ldots, p, j = 1, 2, \ldots, m) \quad (1)$$

where $f_{i,j}(t)$ is a j-th periodic signal extracted from an i-th bio signal or from a bio signal detected from an i-th living body to be authenticated, and F is the Fourier series function. The Fourier series is expanded from first through N-th frequencies where N is a positive integer greater than 1. For example, $f_{2,3}(t)$ indicates a third periodic signal extracted from a bio signal detected from a second living body to be authenticated or from a second bio signal.

The inverse Fourier series of the Fourier series of each of the m extracted periodic signals may be computed using Equation (2):

$$X_{i,j}(t)=IFS(F(f_{i,j}(t))) \qquad (2)$$

where IFS indicates the inverse Fourier series function, and X is a temporally normalized signal.

If a total of p bio signals are input to the biometric identification apparatus and a total of m periodic signals are extracted from each of the p bio signals, the p×m periodic signals may have different patterns and different temporal widths from one another. Therefore, the periodic signal extraction unit 220 generates p×m temporally normalized signals from the p×m periodic signals. The p×m temporally normalized signals, unlike the p×m periodic signals, have the same temporal width. Here, p is a positive integer greater than 1, and the p bio signals may be ECG signals detected from p living bodies.

If the periodic signal extraction unit 220 extracts m periodic signals from the bio signal IN1 and generates m temporally normalized signals using the m periodic signals, the A/D conversion unit 210 may generate digital signals by sampling the m temporally normalized signals. The digital signals generated by the A/D conversion unit 210 are transmitted to the periodic signal extraction unit 220 and then to the template calculation unit 230.

Therefore, the p×m periodic signals detected from each of p bio signals may be analog signals extracted from the bio signal IN1, temporally normalized signals obtained from the respective extracted analog signals, digital signals obtained from the respective temporally normalized signals through sampling, or periodic signals extracted from the respective digital signals obtained through sampling.

For the convenience of explanation, it is assumed that the m periodic signals extracted from the bio signal IN1 by the periodic signal extraction unit 220 are the digital signals obtained from the m temporally normalized signals through sampling. As described above, the m periodic signals extracted from the bio signal IN1 generally have different patterns and different temporal widths from one another, but the m temporally normalized signals have the same temporal width. Thus, if the same pattern of sampling is applied to all of the m temporally normalized signals, the m periodic signals may have the same number of samples. In this regard, the periodic signal extraction unit 220 may extract m periodic signals from the bio signal IN1 and then normalize the numbers of samples of the m periodic signals.

The template calculation unit 230 calculates a template value based on the m periodic signals extracted from the bio signal IN1, the m temporally normalized signals, or the digital signals obtained by sampling the m temporally normalized signals by using Equation (3):

$$W_{k,j}=\aleph_{k,j1}^{T}(t)\cdot\aleph_{k,j2}(t) \qquad (3)$$

where k indicates the bio signal IN1 or a living body corresponding to the bio signal IN1 and has an integer value between 1 and p, and j1 and j2 are values to which j can be set and are determined in advance. For example, j1 may be set to 1, and j2 may be set to an integer value between 2 and m.

If $N_2$ samples are taken from each of the p×m temporally normalized signals, and the digital signals obtained from the m temporally normalized signals through sampling are used to calculate the template values, a template vector, $\aleph$, for the j-th periodic signal extracted from the i-th bio signal or from the bio signal detected from the i-th living body to be authenticated is calculated using Equation (4):

$$\aleph_{i,j}(t)=[X_{i,j}(1),X_{i,j}(2),X_{i,j}(3),\ldots,X_{i,j}(N_2)] \qquad (4).$$

The template vector $\aleph$ may be a matrix comprised of a vector sequence, as indicated in Equation (4).

The template storage unit 240 stores a plurality of template values corresponding to a plurality of living bodies. Each of the template values stored in the template storage unit 240 may be calculated using Equation (5):

$$W_i=\aleph_{i,j}^{T}(t)\cdot\aleph_{i,j}(t) \qquad (5)$$

where $W_i$ is one of the template values stored in the template storage unit 240 and corresponds to the i-th living body.

The reading unit 250 reads a template value that is most approximate to the template value provided by the template calculation unit 230 from the template storage unit 240. In detail, the reading unit 250 reads a template value corresponding to k that minimizes a predetermined vector, $e_k$, from the template storage unit 240. The vector $e_k$ may be calculated using Equation (6):

$$e_k=\aleph_{k,j1}(t)\cdot(W_i-W_{k,j2}) \qquad (6).$$

The identification unit 255 identifies a living body corresponding to the template value read out from the template storage unit 240 as the living body corresponding to the bio signal IN1. The identification unit 255 may be optionally included in the biometric identification apparatus.

The examination unit 260 determines whether the living body corresponding to the read template value is identical to a living body IN2 to be authenticated. The living body IN2 to be authenticated is a living body that the biometric identification apparatus requests to be identified and authenticated. For example, if the bio signal IN1 is a bio signal detected from person A who claims to be person B, then the living body corresponding to the read template value is person A, and the living body IN2 to be authenticated is person B.

The authentication unit 270 decides whether to authenticate the bio signal IN1 as a bio signal detected from the living body IN2 to be authenticated based on the determination results provided by the examination unit 260. In detail, if the determination results provided by the examination unit 260 indicate that the living body corresponding to the read template value is identical to the living body IN2 to be authenticated, the authentication unit 270 authenticates the bio signal IN1 as a bio signal detected from the living body IN2 to be authenticated.

The biometric identification apparatus may optionally include the updating unit 280. The updating unit 280 decides whether to update the template values stored in the template storage unit 240 based on the determination results provided by the examination unit 260. In detail, each of the template values stored in the template storage unit 240 may be updated using Equations (7) and (8):

$$W_i^{new}=a\cdot W_i^{old}+b\cdot W_{k,j} \qquad (7)$$

$$\aleph_{i,j}^{new}(t)=c\cdot\aleph_{i,j}^{old}(t)+d\cdot\aleph_{k,j}(t) \qquad (8)$$

where $W^{old}$ and $\aleph^{old}$ are a template value yet to be updated and a template vector yet to be updated, respectively, $W^{new}$ and $\aleph^{new}$ are an updated template value and an updated template vector, respectively, a+b=1, and c+d=1.

Bio signals detected from the same living body may be different from one another depending on the times when they are respectively detected. Therefore, in the present exemplary embodiment, the authentication unit 270 may confirm that the bio signal IN1 is a bio signal detected from the living body IN2 to be authenticated if the bio signal IN1 is authenticated a predetermined number of times in a row as a bio signal detected from the living body IN2 to be authenticated. The predetermined number may be determined in advance.

For example, suppose that the authentication unit 270 confirms that the bio signal IN1 is a bio signal detected from the living body IN2 to be authenticated only when the bio signal IN1 has been authenticated n times in a row as a bio signal detected from the living body IN2 to be authenticated. When the bio signal IN1 is successfully authenticated as a bio signal detected from the living body IN2 to be authenticated for the first time, the updating unit 280 updates the template values stored in the template storage unit 240, and the authentication unit 270 initiates a second authentication iteration. In detail, the periodic signal extraction unit 220 newly extracts a plurality of periodic signals from the bio signal IN1, and the template calculation unit 230 calculates a template value using the extracted periodic signals. Here, the bio signal IN1 from which the extracted periodic signal originates is from the same living body as the bio signal IN1 that has already been authenticated by the authentication unit 270 and is input a predetermined amount of time after the detection of the bio signal IN1 that has already been authenticated.

The reading unit 250 reads one of the updated template values that is most approximate to the calculation result obtained by the template calculation unit 230 based on the newly extracted periodic signals by from the template storage unit 240. In detail, the reading unit 250 reads an updated template value from the template storage unit 240 corresponding to a k-th bio signal that minimizes a predetermined vector $e_k$. The vector $e_k$ may be calculated using Equation (9):

$$e_k = \aleph_{k,j1}(t) \cdot (W_i^{new} - W_{k,j2}) \qquad (9)$$

If the bio signal IN1 is successfully re-authenticated as a bio signal detected from the living body IN2 to be authenticated in the above-described manner, the authentication unit 270 determines whether the bio signal IN1 has been authenticated n times in a row as a bio signal detected from the living body IN2 to be authenticated. If the number of times the bio signal IN1 has been authenticated as a bio signal detected from the living body IN2 to be authenticated is determined to be equal to n, the authentication unit 270 confirms that the bio signal IN1 is a bio signal detected from the living body IN2 to be authenticated. However, if the number of times the bio signal IN1 has been authenticated as a bio signal detected from the living body IN2 to be authenticated is determined to be less than n, the authentication unit 270 initiates another authentication iteration.

Alternatively, the periodic signal extraction unit 220 may generate m magnitude-normalized signals by normalizing the magnitudes of the m periodic signals. Therefore, the p×m periodic signals may be analog signals extracted from the bio signal IN1, temporally normalized signals obtained from the respective extracted analog signals, digital signals obtained from the respective temporally normalized signals through sampling, periodic signals extracted from the respective digital signals, magnitude-normalized signals obtained by normalizing the magnitudes of the respective extracted analog signals, magnitude-normalized signals obtained by normalizing the magnitudes of the respective temporally normalized signals, digital signals obtained through sampling from the respective magnitude-normalized signals obtained by normalizing the magnitudes of the m extracted signals, or digital signals obtained through sampling from the respective magnitude-normalized signals obtained by normalizing the magnitudes of the m temporally normalized signals. The magnitude-normalized signals may be generated using α, as described below.

Therefore, the template calculation unit 230 may calculate a template value using the m magnitude-normalized signals obtained by normalizing the magnitudes of the m extracted signals, the m magnitude-normalized signals obtained by normalizing the magnitudes of the m temporally normalized signals, the digital signals obtained through sampling from the m magnitude-normalized signals obtained by normalizing the magnitudes of the m extracted signals, or the digital signals obtained through sampling from the m magnitude-normalized signals obtained by normalizing the magnitudes of the m temporally normalized signals.

For the convenience of explanation, it is assumed that the template calculation unit 230 calculates a template value using the digital signals obtained through sampling the m magnitude-normalized signals obtained by normalizing the magnitudes of the m temporally normalized signals. The template calculation unit 230 may calculate template values for the m periodic signals extracted from the bio signal IN1 by using Equation (10):

$$W_{k,j} = (\alpha_k \cdot \aleph_{k,j1}^T(t)) \cdot (\alpha_k \cdot \aleph_{k,j2}(t)) \qquad (10)$$

$$\alpha_k = \frac{A}{B}$$

where $\alpha_k$ is a factor, k indicates the bio signal IN1 or the living body corresponding to the bio signal IN1, j1 and j2 are values to which j can be set and are determined in advance, A is a constant determined in advance, and B is a maximum magnitude of the bio signal IN1.

Each of the template values stored in the template storage unit 240 may be calculated using Equation (11):

$$W_i = (\alpha_i \cdot \aleph_{i,j}^T(t)) \cdot (\alpha_i \cdot \aleph_{i,j}(t)) \qquad (11)$$

$$\alpha_i = \frac{A}{\aleph_{i,j}^{max}}$$

where $\aleph_{i,j}^{max}$ is the greatest element among a plurality of elements of the template vector $\aleph_{i,j}$.

Figure 4:
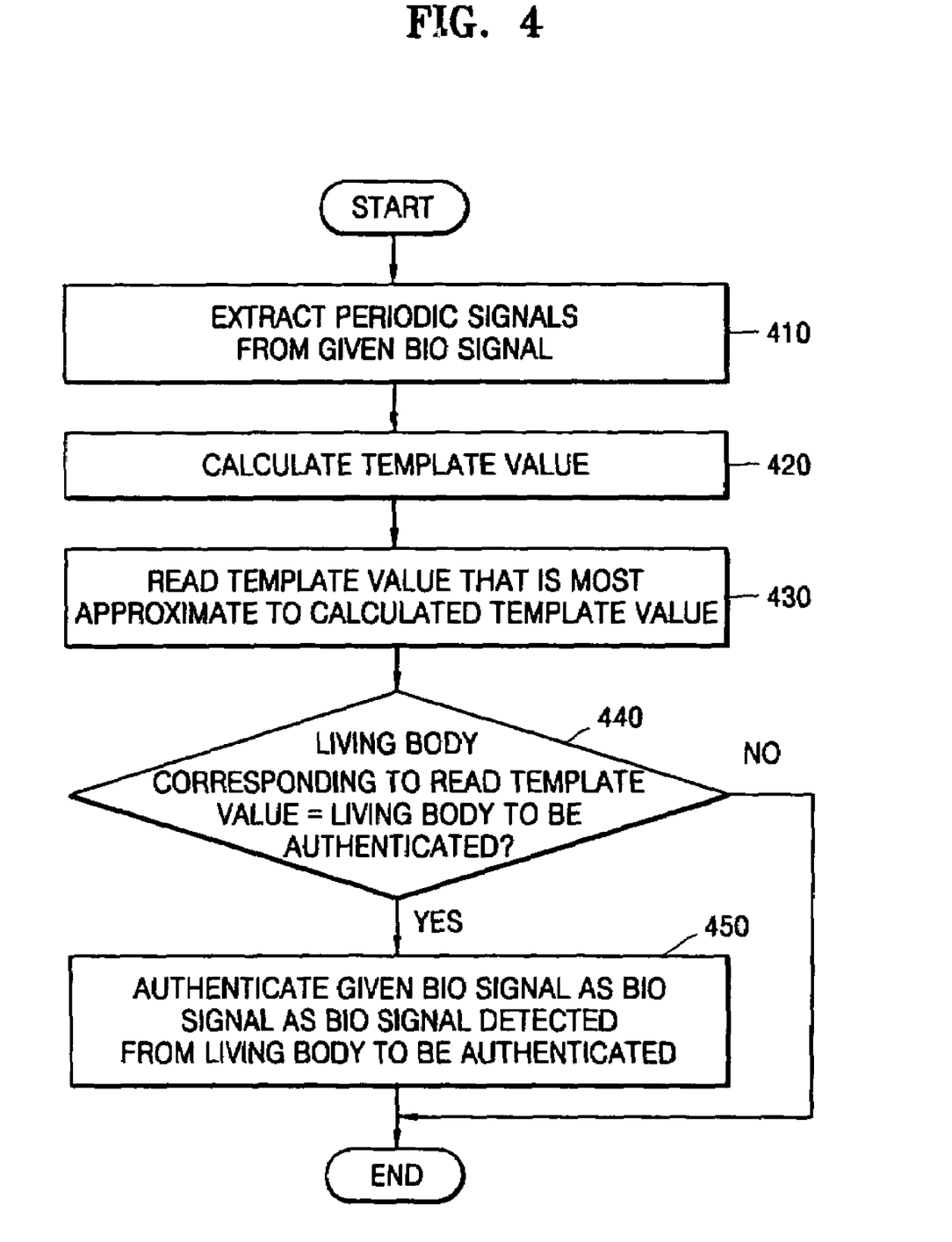
FIG. 4 is a flowchart illustrating a biometric identification method using bio signals and an artificial neural network according to an exemplary embodiment of the present invention.

FIG. 4 is a flowchart illustrating a biometric identification method using bio signals and an artificial neural network according to an exemplary embodiment of the present invention. Referring to FIG. 4, in operation 410, the periodic signal extraction unit 220 extracts a plurality of periodic signals from an input bio signal. In operation 420, the template calculation unit 230 calculates a template value using the extracted periodic signals.

In operation 430, the reading unit 250 reads a template value from the template storage unit 240 that is most approximate to the calculated template value. In operation 440, the examination unit 260 determines whether a living body corresponding to the read template value is identical to a living body to be authenticated.

In operation 450, the authentication unit 270 authenticates the input bio signal as a bio signal detected from the living body to be authenticated.

Figure 5:
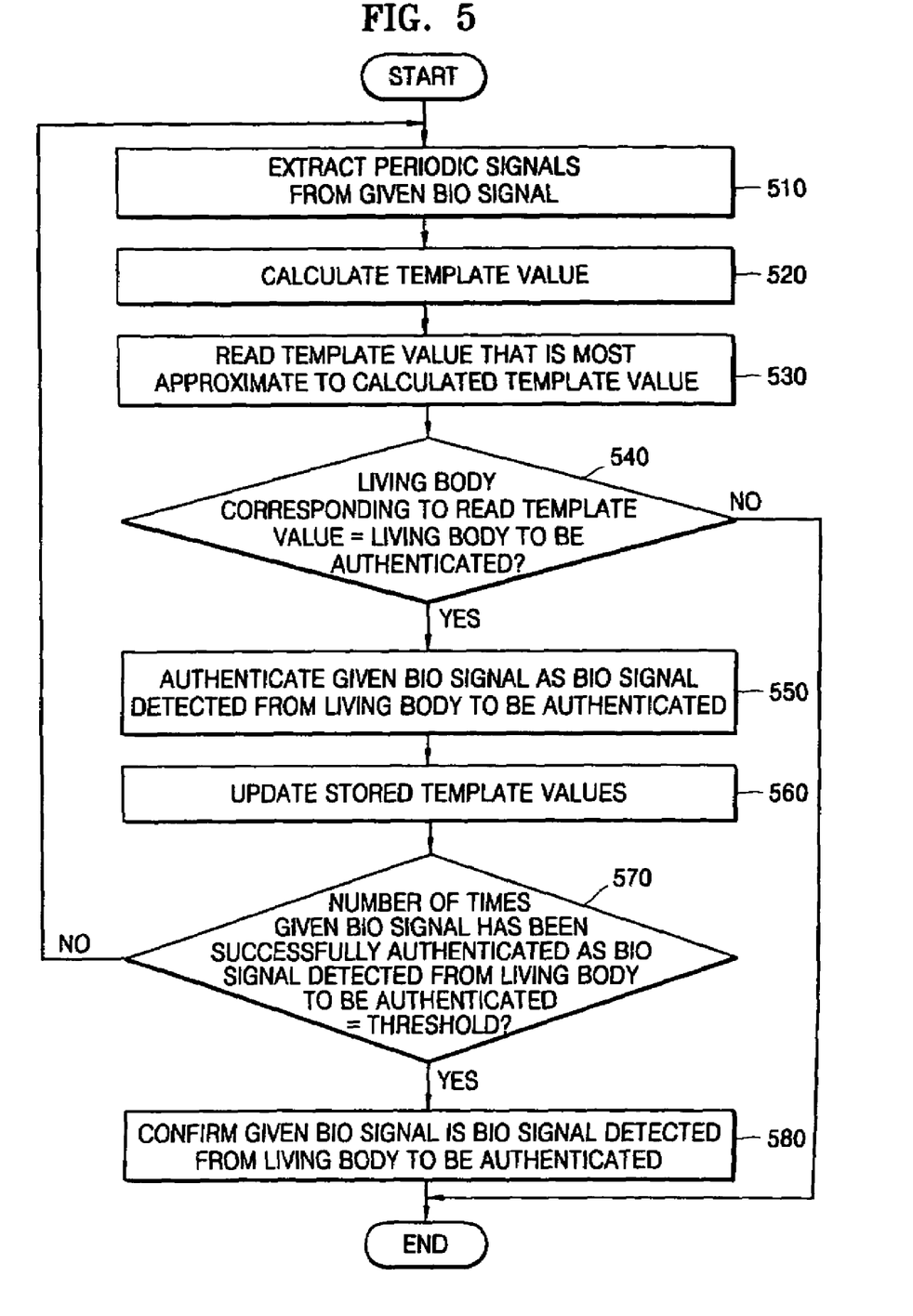
FIG. 5 is a flowchart illustrating a biometric identification method using bio signals and an artificial neural network according to another exemplary embodiment of the present invention.

FIG. 5 is a diagram illustrating a biometric identification method using bio signals and an artificial neural network according to another exemplary embodiment of the present invention. Referring to FIG. 5, in operation 510, the periodic signal extraction unit 220 extracts a plurality of periodic signals from an input bio signal. In operation 520, the template calculation unit 230 calculates a template value using the extracted periodic signals.

In operation 530, the reading unit 250 reads a template value that is most approximate to the calculated template value from the template storage unit 240. In operation 540, the examination unit 260 determines whether a living body corresponding to the read template value is identical to a living body to be authenticated.

In operation 550, if the determination results provided by the examination unit 260 indicate that the living body corresponding to the read template value is identical to the living body to be authenticated, the authentication unit 270 authenticates the input bio signal as a bio signal detected from the living body to be authenticated. In operation 560, the updating unit 280 updates a plurality of template values stored in the template storage unit 240, including the read template value.

In operation 570, the authentication unit 270 determines whether the number of times that the living body to be authenticated has been successfully authenticated is equal to a predetermined threshold. In operation 580, if the number of times that the living body to be authenticated has been successfully authenticated is determined to be equal to the predetermined threshold in operation 570, the authentication unit 270 confirms that the input bio signal is a bio signal detected from the living body to be authenticated. Otherwise, the biometric identification method returns to operation 510.

Figure 6:
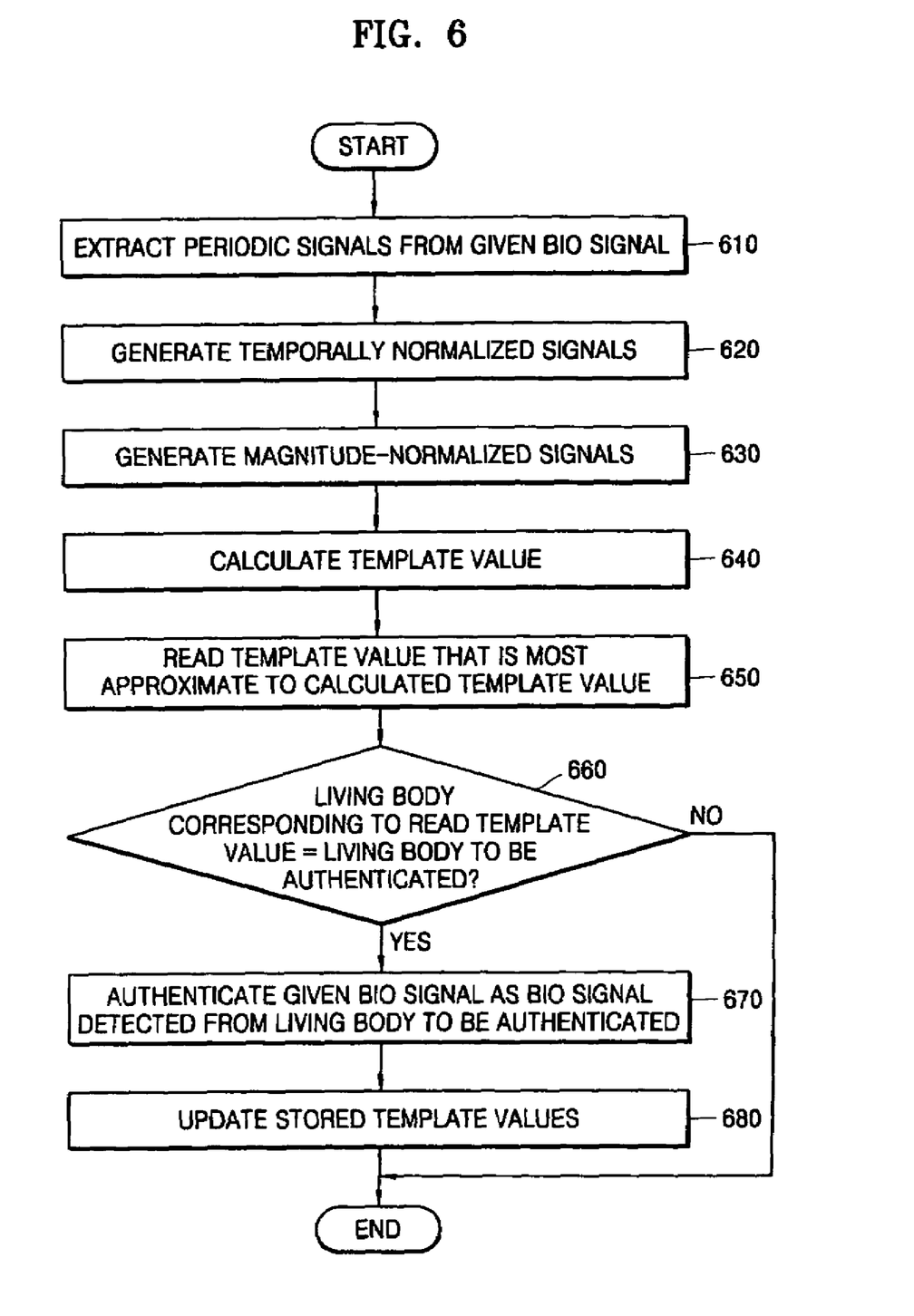
FIG. 6 is a flowchart illustrating a biometric identification method using bio signals and an artificial neural network according to still another exemplary embodiment of the present invention.

FIG. 6 is a flowchart illustrating a biometric identification method using bio signals and an artificial neural network according to still another exemplary embodiment of the present invention. Referring to FIG. 6, in operation 610, the periodic signal extraction unit 220 extracts a plurality of periodic signals from an input bio signal. In operation 620, the periodic signal extraction unit 220 generates temporally normalized signals by temporally normalizing the extracted periodic signals. In operation 630, the periodic signal extraction unit 220 generates magnitude-normalized signals by normalizing the magnitudes of the temporally normalized signals.

In operation 640, the template calculation unit 230 calculates a template value using digital signals obtained by sampling the magnitude-normalized signals.

In operation 650, the reading unit 250 reads a template value from the template storage unit 240 that is most approximate to the calculated template value. In operation 660, the examination unit 260 determines whether a living body corresponding to the read template value is identical to a living body to be authenticated.

In operation 670, if the determination results provided by the examination unit 260 indicate that the living body corresponding to the read template value is identical to the living body to be authenticated, the authentication unit 270 authenticates the input bio signal as a bio signal detected from the living body to be authenticated. In operation 680, the updating unit 280 updates a plurality of template values stored in the template storage unit 240, including the read template value.

The exemplary embodiments of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily deduced by one of ordinary skill in the art.

As described above, according to aspects of the present invention, it is possible to precisely identify a living body by taking into consideration all of the properties of bio signals detected from the living body.

In addition, it is possible to more precisely identify a living body by taking into consideration the fact that bio signals detected from the same living body may vary with time or may depend on the state of the living body.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A biometric identification apparatus comprising:
a periodic signal extraction unit which extracts one or more periodic signals from an input bio signal;
a template calculation unit which calculates a template value using the periodic signals which are extracted, the template value comprising a connection strength between neurons of an artificial neural network corresponding to the bio signal;
a template storage unit which stores a plurality of template values which correspond to a plurality of living bodies; and
a reading unit which reads the template value that is most approximate to the template value which is calculated by the template calculation unit from the template storage unit.

2. The biometric identification apparatus of claim 1 further comprising an identification unit which identifies a living body corresponding to the template value which is read out from the template storage unit as a living body which corresponds to the input bio signal.

3. The biometric identification apparatus of claim 1 further comprising:
an examination unit which determines whether a living body corresponding to the template value which is read out from the template storage unit is identical to a living body to be authenticated; and
an authentication unit which authenticates the input bio signal as a bio signal which is detected from the living body to be authenticated in response to the determination results which are provided by the examination unit.

4. The biometric identification apparatus of claim 1 further comprising an analog-to-digital conversion unit which converts the input bio signal into a digital signal through a sampling operation,
wherein the periodic signal extraction unit extracts one or more periodic signals from the digital signal into which the input bio signal is converted.

5. The biometric identification apparatus of claim 1, further comprising:
an examination unit which determines whether a living body corresponding to the template value which is read out from the template storage unit is identical to a living body to be authenticated; and an updating unit which updates the stored template value in response to the determination results which are generated by the examination unit.

6. The biometric identification apparatus of claim 1, wherein the periodic signal extraction unit generates magnitude-normalized signals by normalizing the magnitude of the periodic signals which are extracted, and the template calculation unit calculates the template value using the magnitude-normalized signals.

7. The biometric identification apparatus of claim 6 further comprising:

an examination unit which determines whether a living body corresponding to the template value read out from the template storage unit is identical to a living body to be authenticated; and an authentication unit which authenticates the input bio signal as a bio signal which is detected from the living body to be authenticated in response to the determination results which are generated by the examination unit.

8. A biometric identification apparatus comprising:

a periodic signal extraction unit which extracts one or more periodic signals from an input bio signal;

a template calculation unit which calculates a template value using the periodic signals which are extracted;

a template storage unit which stores a plurality of template values which correspond to a plurality of living bodies; and a reading unit which reads the template value that is most approximate to the template value which is calculated by the template calculation unit from the template storage unit, wherein the periodic signal extraction unit generates temporally normalized signals by computing a Fourier series of each of the periodic signals which are extracted and then computing an inverse Fourier series of the Fourier series of each of the periodic signals which are extracted.

9. The biometric identification apparatus of claim 8 further comprising an analog-to-digital conversion unit which converts the temporally normalized signals which are generated into digital signals through a sampling operation, wherein the template calculation unit calculates the template value using the digital signals, and the digital signals each comprises an identical number of samples.

10. The biometric identification apparatus of claim 9, wherein the template values which are stored in the template storage unit are calculated using the following equations:

$$W_i = \aleph_{i,j}^T(t) \cdot \aleph_{i,j}(t)$$

$$\aleph_{i,j}(t) = [X_{i,j}(1), X_{i,j}(2), X_{i,j}(3), \ldots, X_{i,j}(N_2)]$$

$$X_{i,j}(t) = IFS(F(f_{i,j}(t)))$$

where $W_i$ is a template value for an i-th living body which is stored in the template storage unit, i is an integer between 1 and p (where p is a positive integer greater than 1), j indicates the extracted period signal and is an integer between 1 and m (where m is a positive integer greater than 1), F indicates a Fourier series function, IFS indicates an inverse Fourier series function, X is a temporally normalized signal, $N_2$ indicates a total number of samples included in the digital signal into which the temporally normalized signal X is converted, $\aleph$ is a template vector, and T is a transpose.

11. The biometric identification apparatus of claim 10, wherein the template calculation unit calculates the template value for a k-th living body corresponding to the input bio signal using the following equation:

$$W_{k,j} = \aleph_{k,j1}^T(t) \cdot \aleph_{k,j2}(t)$$

where j1 and j2 are values to which j can be set and are determined in advance.

12. The biometric identification apparatus of claim 11, wherein the reading unit reads the template value corresponding to k from the template storage unit that minimizes a magnitude of a vector $(e_k)$ calculated using the following equation:

$$e_k = \aleph_{k,j1}(t) \cdot (W_i - W_{k,j2}).$$

13. The biometric identification apparatus of claim 8, wherein the template calculation unit calculates the template value using the temporally normalized values which are generated, the temporally normalized signals which are generated each having an identical temporal width.

14. A biometric identification apparatus comprising:

a periodic signal extraction unit which extracts one or more periodic signals from an input bio signal;

a template calculation unit which calculates a template value using the periodic signals which are extracted;

a template storage unit which stores a plurality of template values which correspond to a plurality of living bodies;

a reading unit which reads the template value that is most approximate to the template value which is calculated by the template calculation unit from the template storage unit;

an examination unit which determines whether a living body corresponding to the template value which is read out from the template storage unit is identical to a living body to be authenticated; and an updating unit which updates the stored template value in response to the determination results which are generated by the examination unit, wherein the updating unit updates the stored template value using the following equations:

$$W_i^{new} = a \cdot W_i^{old} + b \cdot W_{k,j}$$

$$\aleph_{i,j}^{new}(t) = c \cdot \aleph_{i,j}^{old}(t) + d \cdot \aleph_{k,j}(t)$$

where $W^{new}$ and $\aleph^{new}$ are an updated template value and an updated template vector, respectively, $W^{old}$ and $\aleph^{old}$ are a template value yet to be updated and a template vector yet to be updated, respectively, a+b =1, and c+d=1.

15. The biometric identification apparatus of claim 14, wherein the reading unit reads the template value corresponding to k from the template storage unit that minimizes a magnitude of a vector $(e_k)$ is calculated using the following equation:

$$e_k = \aleph_{k,j1}(t) \cdot (W_i^{new} - W_{k,j2}).$$

16. A biometric identification apparatus comprising:

a periodic signal extraction unit which extracts one or more periodic signals from an input bio signal;

a template calculation unit which calculates a template value using the periodic signals which are extracted;

a template storage unit which stores a plurality of template values which correspond to a plurality of living bodies; and a reading unit which reads the template value that is most approximate to the template value which s calculated by the template calculation unit from the template storage unit;

an examination unit which determines whether a living body corresponding to the template value read out from the template storage unit is identical to a living body to be authenticated; and an authentication unit which authenticates the input bio signal which is detected from the living body to be authenticated in response to the determination results which are generated by the examination unit, wherein the periodic signal extraction unit generates magnitude-normalized signals by normalizing the magnitude of the periodic signals which are extracted, and the template calculation unit calculates the template value using the magnitude-normalized signals, and wherein the template values stored in the template storage unit are calculated using the following equations:

$$W_i = (\alpha_i \cdot \aleph_{i,j}^T(t)) \cdot (\alpha_i \cdot \aleph_{i,j}(t))$$

$$\aleph_{i,j}(t) = [X_{i,j}(1), X_{i,j}(2), X_{i,j}(3), \ldots, X_{i,j}(N_2)]$$

$$X_{i,j}(t) = IFS(F(f_{i,j}(t)))$$

where $$\alpha_i = \frac{A}{\aleph_{i,j}^{max}},$$

$\aleph_{i,j}(t)$ is a template vector, $\aleph_{i,j}^{max}$ is a greatest element among a plurality of elements of the template vector, $W_i$ is a template value of an i-th living body stored in the template storage unit, i is an integer between 1 and p (where p is a positive integer greater than 1), j indicates the extracted period signal and is an integer between 1 and m (where m is a positive integer value greater than 1), F indicates a Fourier series function, IFS indicates an inverse Fourier series function, X is a temporally normalized signal, $N_2$ indicates a total number of samples included in the digital signal into which the temporally normalized signal X is converted, and T is a transpose.

17. The biometric identification apparatus of claim 16, wherein the template calculation unit calculates the template value for a k-th living body using the following equation:

$$W_{k,j} = (\alpha_k \cdot \aleph_{k,j1}^T(t)) \cdot (\alpha_k \cdot \aleph_{k,j2}(t))$$

where $$\alpha_k = \frac{A}{B}$$

(where A is a predetermined constant and B is a maximum magnitude of the input bio signal), and j1 and j2 are values to which j can be set and are determined in advance.

18. The biometric identification apparatus of claim 17, wherein the reading unit reads the template value corresponding to k from the template storage unit that minimizes a magnitude of a vector ($e_k$) calculated using the following equation:

$$e_k = (\alpha_k \cdot \aleph_{k,j1}(t)) \cdot (W_i - W_{k,j2}).$$

19. A biometric identification method comprising:
by a sensor, sensing a bio signal of a living body;
using a processor (or computer) to perform the steps of:
extracting one or more periodic signals from the bio signal;
calculating a template value using the extracted periodic signals, the template comprising a connection strength between neurons of an artificial neural network corresponding to the bio signal; and reading a template value that is most approximate to the template value which is calculated from among a plurality of prepared template values which correspond to a plurality of living bodies and identifying a living body which corresponds to the template value which is read as a living body which corresponds to the bio signal.

20. The biometric identification method of claim 19 further comprising:
determining whether the living body which corresponds to the template value which is read is identical to a living body to be authenticated; and
authenticating the given bio signal as a bio signal which is detected from the living body to be authenticated if the living body which corresponds to the read template value is determined to be identical to the living body to be authenticated.

21. The biometric identification method of claim 19 further comprising:
determining whether the living body which corresponds to the template value which is read is identical to a living body to be authenticated; and
updating the prepared template values which correspond to the living bodies if the living body which corresponds to the template value which is read is determined to be identical to the living body to be authenticated.

22. The biometric identification method of claim 19, wherein the extracting of the periodic signals comprises generating magnitude-normalized signals by normalizing the magnitudes of the extracted periodic signals, and the calculating of the template value comprises calculating the template value using the magnitude-normalized signals.

23. A biometric identification method comprising:
by a sensor, sensing a bio signal of a living body;
using a processor (or computer) to perform the steps of:
extracting one or more periodic signals from a the bio signal;
calculating a template value using the extracted periodic signals; and
reading a template value that is most approximate to the template value which is calculated from among a plurality of prepared template values which correspond to a plurality of living bodies and identifying a living body which corresponds to the template value which is read as a living body which corresponds to the bio signal,
wherein the extracting of the periodic signals comprises generating temporally normalized signals by computing a Fourier series of each of the periodic signals and then computing an inverse Fourier series of the Fourier series of each of the periodic signals.

24. The biometric identification method of claim 23, wherein the extracting of the periodic signals comprises converting the temporally normalized signals into digital signals through a sampling operation,
wherein the calculating of the template value comprises calculating the template value using the digital signals, and the digital signals comprise an identical number of samples.

25. The biometric identification method of claim 23, wherein the calculating of the template value comprises calculating the template value using the temporally normalized signals, said temporally normalized signals having an identical temporal width.

26. A computer-readable recording medium storing a computer program for executing a biometric identification method, the biometric identification method comprising:

extracting one or more periodic signals from a given bio signal;

calculating a template value using the extracted periodic signals, the template value comprising a connection strength between neurons of an artificial neural network corresponding to the bio signal; and reading a template value that is most approximate to the template value which is calculated from among a plurality of prepared template values which corresponds to a plurality of living bodies and identifying a living body which corresponds to the template value which is read as a living body which corresponds to the given bio signal.

* * * * *